United States Patent
Moon et al.

(10) Patent No.: US 7,526,123 B2
(45) Date of Patent: Apr. 28, 2009

(54) ESTIMATING FACIAL POSE FROM A SPARSE REPRESENTATION

(75) Inventors: Hankyu Moon, Lawrenceville, NJ (US); Matthew L. Miller, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 634 days.

(21) Appl. No.: 10/813,767

(22) Filed: Mar. 31, 2004

(65) Prior Publication Data

US 2005/0180626 A1 Aug. 18, 2005

Related U.S. Application Data

(60) Provisional application No. 60/543,963, filed on Feb. 12, 2004.

(51) Int. Cl.
*G06K 9/62* (2006.01)

(52) U.S. Cl. ............... 382/159; 382/118; 382/170; 382/165; 382/162

(58) Field of Classification Search ........... 382/118, 382/159, 170, 165, 162, 164, 117
See application file for complete search history.

(56) References Cited

U.S. PATENT DOCUMENTS

| | | | |
|---|---|---|---|
| 6,959,109 B2 * | 10/2005 | Moustafa | 382/159 |
| 7,035,467 B2 * | 4/2006 | Nicponski | 382/224 |
| 7,236,615 B2 * | 6/2007 | Miller et al. | 382/118 |
| 7,274,832 B2 * | 9/2007 | Nicponski | 382/297 |
| 7,333,653 B2 * | 2/2008 | Luo et al. | 382/165 |
| 2005/0058337 A1 * | 3/2005 | Fujimura et al. | 382/159 |
| 2006/0034495 A1 * | 2/2006 | Miller et al. | 382/118 |

OTHER PUBLICATIONS

Y.Li, S.Gong, and H. Liddell in an article entitled "Support vector regression and classification based on multi-view face detection and recognition", which was presented at FG2000.*
Estimating Facial Pose from a sparse representation (Hankyu Moon and Matt Miller NEC Labratories America; 2004 International conference on image processing; ICP).*
Multi-view face pose classification by tree structures classifier; yang et al, IEEE 2005.*
Learning a Sparse representation from multiple still images for on-line face recognition in an unconstrained environment, Shouten et al; IEEE 2006.*

(Continued)

*Primary Examiner*—Jingge Wu
*Assistant Examiner*—Nancy Bitar
(74) *Attorney, Agent, or Firm*—Brosemer, Kolefas & Associates LLC

(57) ABSTRACT

A method for accurately estimating a pose of the human head in natural scenes utilizing positions of the prominent facial features relative to the position of the head. A high-dimensional, randomly sparse representation of a human face, using a simplified facial feature model transforms a raw face image into sets of vectors representing the fits of the face to a random, sparse set of model configurations. The transformation collects salient features of the face image which are useful to estimate the pose, while suppressing irrelevant variations of face appearance. The relation between the sparse representation of the pose is learned using Support Vector Regression (SVR). The sparse representation, combined with the SVR learning is then used to estimate a pose of facial images.

3 Claims, 13 Drawing Sheets

OTHER PUBLICATIONS

Y.Li, S.Gong, and H. Liddell in an article entitled "Support vector regression and classification based on multi-view detection and recognition", which was presented at FG200.*

Estimating Facial pose from a sparse representation, IEEE 2004.*
A sparse Texture representation using local affine regions, Lazebnik et al, 2003.*

* cited by examiner

ESTIMATING FACIAL POSE FROM A SPARSE REPRESENTATION

CROSS REFERENCE TO RELATED APPLICATIONS

This application claims the benefit of U.S. Provisional Application No. 60/543,963 filed Feb. 12, 2004.

FIELD OF THE INVENTION

This invention relates generally to the field of personal identification and in particular to a method of determining facial poses of the human head in natural scenes.

BACKGROUND OF THE INVENTION

A hurdle encountered in human face recognition problems is how to deal with variations in facial images due to facial pose changes. Consequently, while limited desirable facial recognition results have been obtained with frontal facial images, recognition performance degrades quickly with variations in facial pose. Accordingly, accurate measurements of facial pose may facilitate facial recognition if some form of the measurement data, such as 3D models of the face or sampled facial images across pose(s)—which may generate the facial image—is available.

Intuitively, the pose of an object can be estimated by comparing the positions of salient features of the object. For a human face, the positions, for example, of the eyes, eyebrows and mouth are usually visible and prominent. And while a global shape of the human face is highly variable from person to person according to age, gender, hairstyle, the size and shape of these facial features generally vary within predictable ranges. As a result, these and other features may be used to render distinct gradient signatures in images that are distinguishable from one another.

Prior art methods of determining head pose estimation, while advantageously employing learning approaches, have met with limited success. In particular, a method disclosed by N. Kruger, M. Patzsch, and C. Van der Malsberg, in an article entitled "Determination of face position and pose with a learned representation based on labeled graphs", which appeared in Image and Vision Computing, Vol. 15, pp. 665-673, 1997, performs the estimation of position and pose by matching the facial image to the learned representation of bunch graphs. In addition, a method disclosed by Y. Li, S. Gong, and H. Liddell in an article entitled "Support vector regression and classification based on multi-view face detection and recognition", which was presented at FG2000, also employed Support Vector Regression (SVR) learning on the PCA subspace of the outputs from directional Sobel filters. Lastly, S. Li, J. Yan, X. W. Hou, Z. Y. Li and H. Zhang disclose a method utilizing two stages of the support vector learning, by first training an array of SVR's to produce desired output signatures, then training the mapping between the signatures and the facial poses, in "Learning Low Dimensional Invarient Signatures of 3-D Object under Varying View and Illumination from 2-D Appearances," which appeared in ICCV 2001.

Despite such progress, more efficient, expedient approaches are required. It is therefore the object of the present invention to provide a method of determining the pose of a human head in natural scenes such that our method may facilitate the development of human recognition systems.

SUMMARY OF THE INVENTION

We have invented a sparse representation of the human face, which captures unique signatures of the human face while facilitating the estimation of head position and pose. The representation is a collection of projections to a number of randomly generated possible configurations of the face.

According to an aspect of our invention, a projection corresponds to a pose of the head along with facial features' configuration, which responds to changes in pose and feature configuration, while not responding to other variations such as lighting, hair and background. In a preferred embodiment, a representation includes two parts: 1) parameter vectors which encode both the position and pose of the head, along with shape and size of facial features and their "fits" to the facial image; and 2) a large number of randomly generated set (1)'s. Weighting(s) of a given parameter vector are computed by first, predicting 2D signatures of the facial features corresponding to a given parameter; and second, computing a match between the 2D signature and the facial image.

Advantageously, our inventive method includes particular attributes of well-understood particle filter approaches, which are known to efficiently solve tracking and motion estimation problems. The randomly generated motion parameter vectors along with the weights computed from image measurements permit the estimation and propagation of the probability density of the motion vector efficiently, even when state space is extremely high-dimensional. And while generating samples that uniformly cover the entire parameter range is not presently feasible—due to the dimensionality (28 dimensional space for the problem at hand)—we have found that only 500 samples were sufficient to represent the head shape for the pose estimation determination, when a reasonably good initial prediction (or a good initial density) is determined to estimate subsequent densities.

Advantageously, the type and/or kind of filters that we use for picking up gradient responses from facial features, will correctly estimate the pose of the head when the random samples are generated in a region that is close to the true state in the parameter space.

DETAILED DESCRIPTION

Sparse Representation of the Face and the Pose

Figure 1:
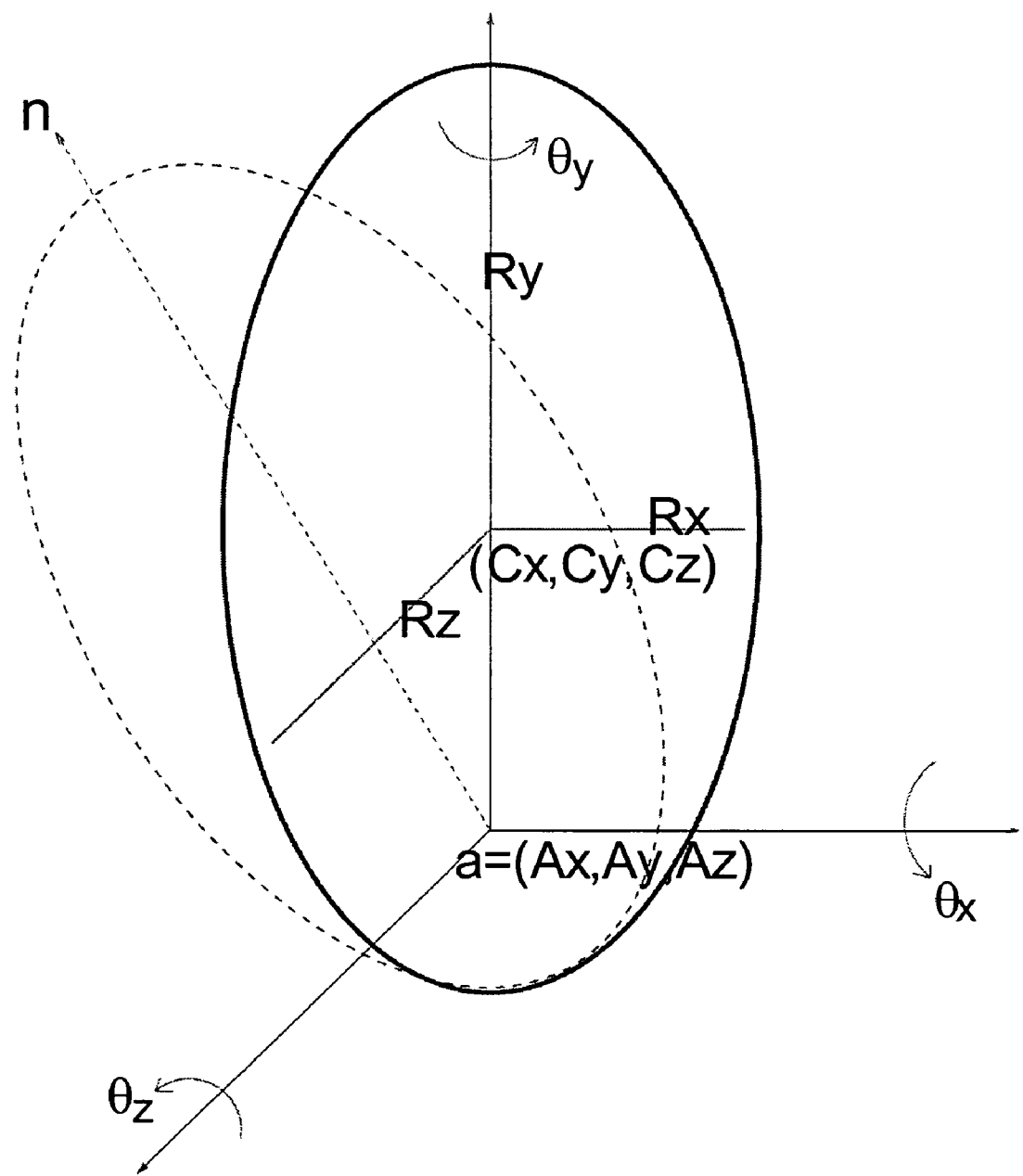
FIG. 1 is a schematic representation of a rotational model of a head.

While the size and the shape of the human face varies within small ranges, it is hard to model the variety of appearance of the human head, or the face in real life due, in part, to changes in hair style or clothing. On the other hand, the facial elements such as eyes or mouth are usually exposed to view, and their sizes, shapes and relative positions vary within a relatively limited range. In addition, the appearance of such features usually does not vary much with different lighting conditions. As such, we can model the image projections of these features using simple curves on a 2D surface, and changes in their appearance due to pose changes can be modeled using the rotation of the surface. FIG. 1 is a schematic representation for our rotational model of the human head.

A. Head Model

With reference now to that FIG. 1, we model the head as an ellipsoid in xyz space, with z being the camera axis. Represented mathematically:

$$E(x, y, z) = E_{R_x, R_y, R_z, C_x, C_y, C_z}(x, y, z)$$
$$\triangleq \frac{(x-C_x)^2}{R_x^2} + \frac{(y-C_y)^2}{R_y^2} + \frac{(z-C_z)^2}{R_z^2} = 1$$

We represent the pose of the head by three rotation angles $(\theta_x, \theta_y, \theta_z)$; where $\theta_x$ and $\theta_z$ measure the rotation of the head axis n, and the rotation of the head around n, is denoted by $\theta_y(=\theta_n)$. The center of rotation is assumed to be near the bottom of the ellipsoid, denoted by $a=(a_x, a_y, a_z)$, which is measured from $(C_x, C_y, C_z)$ for convenience. And since the rotation of n and the rotation around it is commutative, we can think of any change of head pose as rotation around the y axis, followed by "tilting" of the axis.

If we let $Q_x, Q_y$, and $Q_z$ be rotation matrices around the x, y, and z, respectively, and let $p=(x',y',z')$ be any point on the ellipsoid $E_{R_x,R_y,R_z,C_x,C_y,C_z}$ (x,y,z). Accordingly, p moves to $p'=(x',y',z')$ under rotation $Q_y$ followed by rotations $Q_x$ and $Q_z$:

$$p'=Q_zQ_xQ_y(p-t-a)+a+t \quad [1]$$

Note that $t=t_{(C_x,C_y,C_z)}=(C_x,C_y,C_z)$ represents the position of the ellipsoid before rotation.

Figure 2:
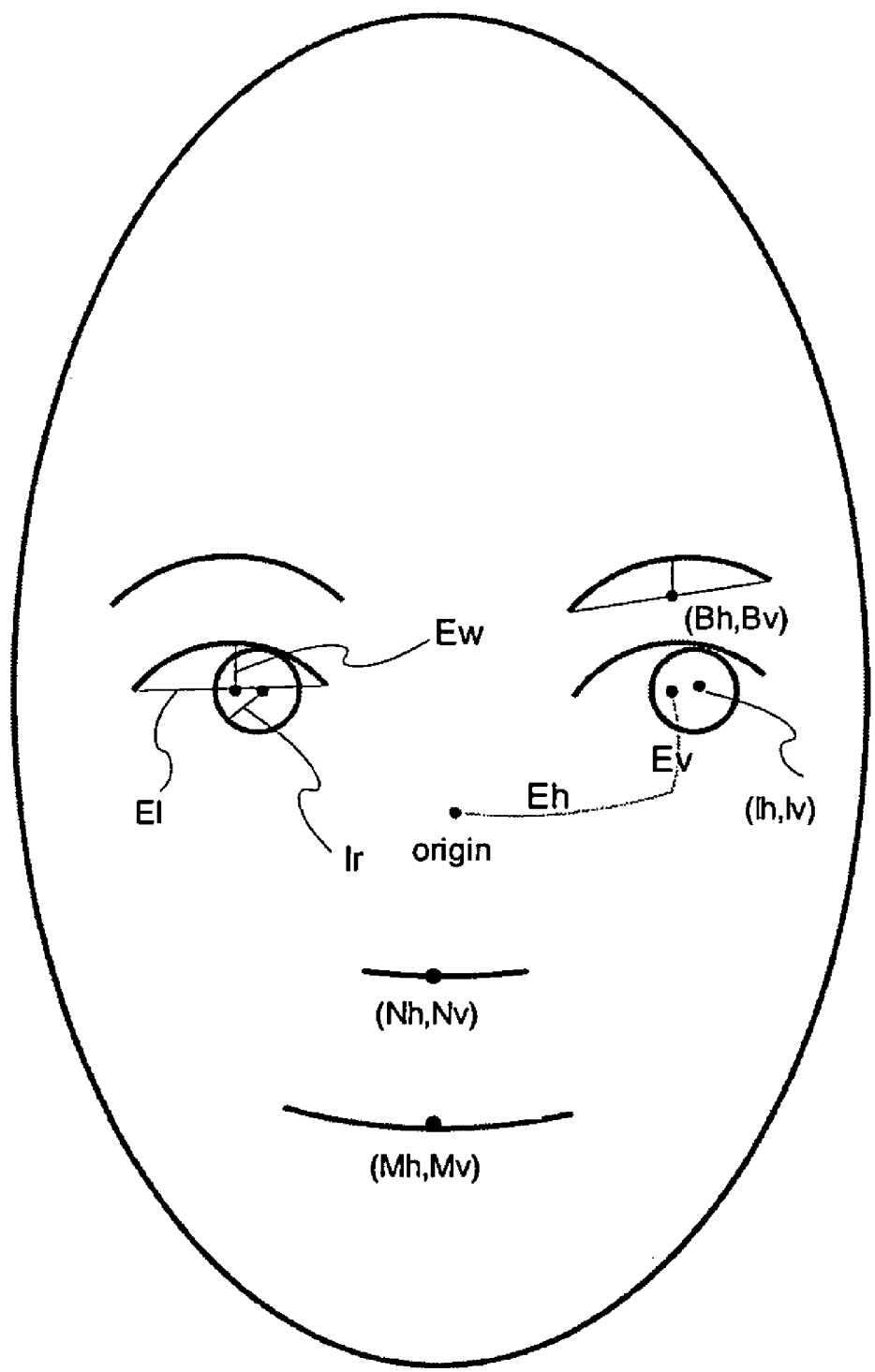
FIG. 2 is a schematic representation of an ellipsoidal head model and parameterization of facial features.

FIG. 2 is a schematic of our ellipsoidal head model showing the parameterization of facial features. With reference to that FIG. 2, it is noted that the eyes and eyebrows are undoubtedly the most prominent features of the human face. The round curves made by the upper eyelid and the circular iris give unique signatures which are preserved under changes in illumination and facial expression. Features such as the eyebrows, mouth, and the bottom of the nose are also modeled as curves in the same manner.

The feature curves are approximated by circles or circular arcs on the (head) ellipsoid. We parameterize the positions of these features by using the spherical coordinate system (azimuth, altitude) on the ellipsoid. A circle on the ellipsoid is given by the intersection of a sphere centered at a point on the ellipsoid with the ellipsoid itself. Typically, 28 parameters are used including 6 pose/location parameters.

B. Computing the Projections of a Face Image

We measure the model fit using a shape filter introduced by H. Moon, R. Chellappa, and A. Rosenfeld, in an article entitled "Optimal Shape Detection", which appeared in ICIP, 2000. This filter is designed to accurately integrate the gradient response of the image element that forms a certain shape. In the given application, the filters are constructed to accumulate the edge response along the boundary of an eye, boundary of the eyebrows, etc. The filter is shaped so that the response is smooth with respect to the changes in the position and the shapes, between the model and the image data.

An optimal one-dimensional smoothing operator, designed to minimize the sum of noise response power and step edge response error, is shown to be $$g_\sigma(t) = \frac{1}{\sigma}\exp(-|t|/\sigma).$$

Then the shape operator for a given shape region D is defined by:

$$G(x)=g_\sigma'(l(x));$$

Where the level function/is implemented by:

$$l(x) = \begin{cases} +\min_{z \in C} \| x - z \| \text{ for } x \in D \\ -\min_{z \in C} \| x - z \| \text{ for } x \in D^c \end{cases}$$

Figure 3:
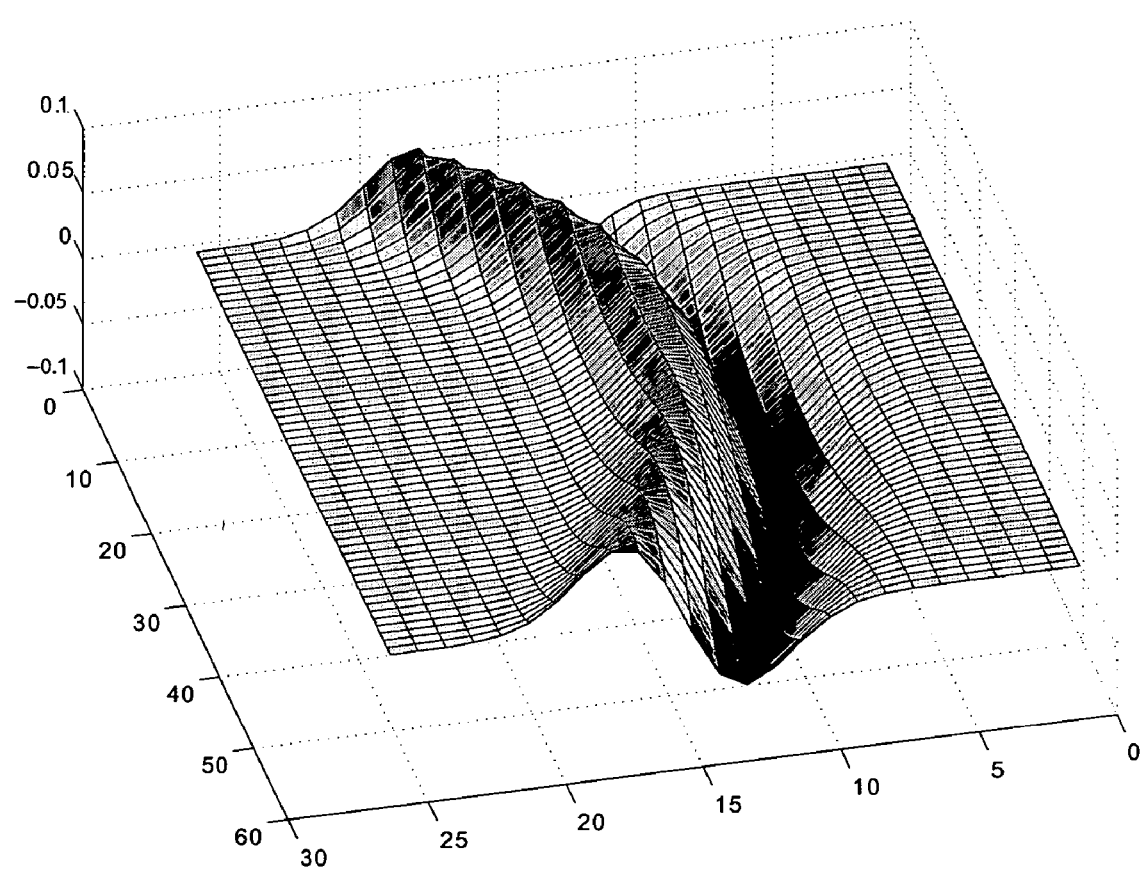
FIG. 3 is a graph showing a shape filter in which the shape is matched to a circular arc to detect eye outline and the cross-section is designed to detect the intensity change along the boundary.

With reference to FIG. 3, there is shown a shape operator (filter) for a circular arc feature, matched to an eye outline or eyebrow. Advantageously, the shape is matched to a circular arc to detect the eye outline, and the cross-section is designed to detect the intensity change along the boundary.

The response of a local image/of an object to the operator $G_\alpha$, having geometric configuration α is:

$$r^\alpha = \int G_\alpha(u)I(u)du$$

Using this set of filters, the gradient information is computed bottom-up, from the raw intensity image.

The kind of filters that we use for picking up gradient responses from facial features, will correctly estimate the pose of the head if the random samples are generated in a region that is close to the true state in the parameter space. When such initial estimates are not given, we preferably generate the random particles such that they span the wide range of parameter values to cover the correct value.

Some of the particles, however, will pick up responses from irrelevant regions such as facial boundaries or the hair, and bias the estimates. We have found that the estimates using the weighted sum of the particles, are highly biased when some of the particles collect strong gradient response from the facial boundary.

Such off-match responses, however, also provide useful information about the pose of the head. For example, if the "left-eye filter" yields very strong response when it is slightly moved (or "rotated") to the right and keeps the level of response consistently when moved along the vertical direction, it is probable that the face is rotated to the left. This observation led us to make use of the whole set of representation that covers wide ranges of model parameters. The facial image will respond to the projections close to the true pose, and form a sharp peak, not necessarily a global maximum, around it. Other off-match projections could generate sufficient responses, yet the collective response will yield a different shape.

C. Camera Model and Filter Construction

Figure 4:
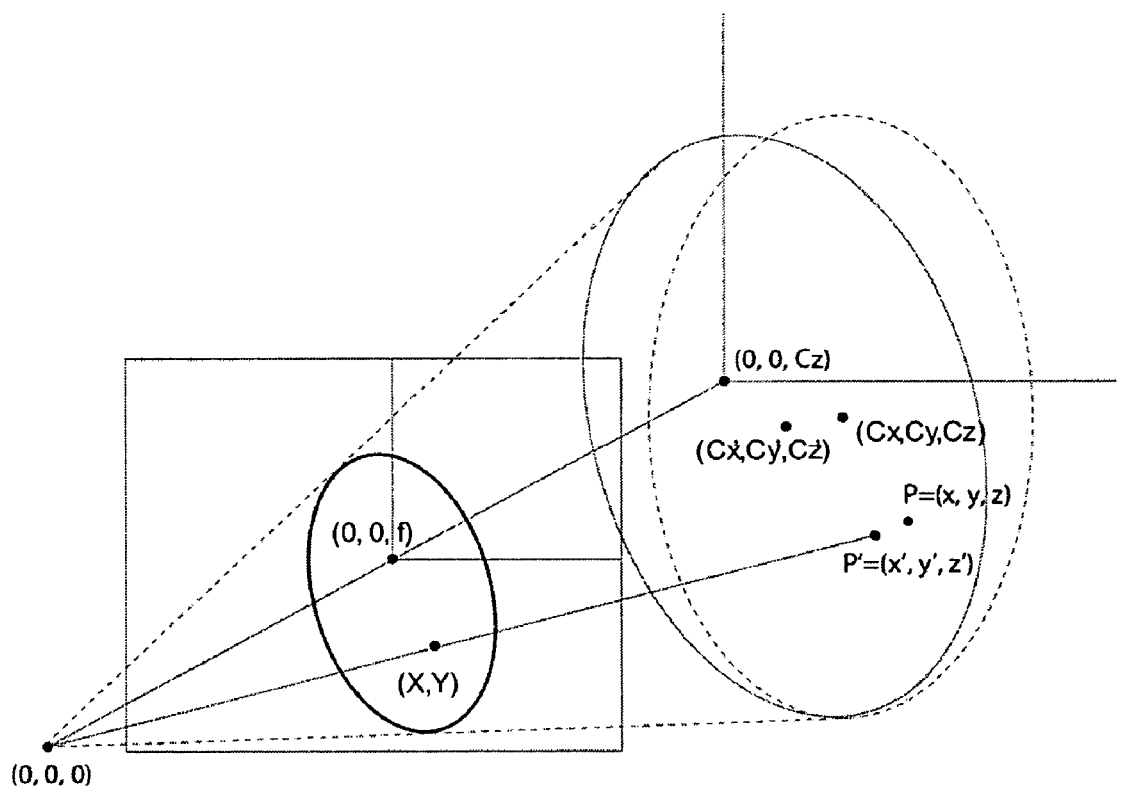
FIG. 4 shows a perspective projection for a camera according to the present invention.

FIG. 4. shows a perspective projection model of the camera used in our inventive method. In operation, we combine the head model and camera model to compute the depth of each point on the face, so that we can compute the inverse projection and construct the corresponding operator. The center of the perspective projection is (0,0,0) and the image plane is defined as $z=f$.

With continued reference to that FIG. 4, we let $P=(X,Y)$ be the projection of $p'=(x',y',z')$ on the ellipsoid. These two points are related by:

$$\frac{X}{f} = \frac{x'}{z'} \text{ and } \frac{Y}{f} = \frac{y'}{z'} \quad [2]$$

Given $\xi=(C_x,C_y,C_z,\theta_x,\theta_y,\theta_z,v)$ the hypothetical geometric parameters of the head and feature (simply denoted by v), we need to compute the inverse projection on the ellipsoid to construct the shape operator.

Suppose the feature curve on the ellipsoid is the intersection (with the ellipsoid) of the circle $\|(x,y,z)-(e_x^\xi,e_y^\xi,e_z^\xi)\|^2=R_e^{\xi 2}$, centered at $(e_x^\xi,e_y^\xi,e_z^\xi)$ which is on the ellipsoid. Let $P=(X,Y)$ be any point on the image. The inverse projection of P is the line defined by equation [2]. The point (x',y',z') on the ellipsoid is computed by solving equation [2], combined with the quadratic equation $E_{R_x,R_y,R_z,C_x,C_y,C_z}(x,y,z)=1$. This solution exists and is unique, since we seek the solution on the visible side of the ellipsoid.

The point (x,y,z) on the reference ellipsoid $E_{0,0,0,C_x,C_y,C_z}$, (x,y,z)=1 is computed using the inverse operation of equation [1].

If we define the mapping from (X,Y) to (x,y,z) by $$\rho(X,Y) \triangleq (x,y,z) \triangleq (\rho_x(X,Y),\rho_y(X,Y),\rho_z(X,Y)) \quad [3]$$

then we may construct the shape filter as:

$$h^\xi(X,Y)=h_\sigma(\|(\rho(X,Y)-(e_x^\xi,e_y^\xi,e_z^\xi)\|^2-R_e^{\xi 2})$$

D. Generation of Samples and the Support Vector Regression

A large number of samples $\{X^n|n=1,2,\ldots,N\}$ that represent the pose of the model and the position and shapes of the facial features are generated. Each vector $X_n$ then constructs the set of shape filters that will compute the image responses:

$$R_n=\{eyel_n, eyer_n, brol_n, bror_n, irisl_n, irisr_n, nose_n, mouth_n, head_n\}; \quad [4]$$

for each of the facial features, to the total of 9N dimensional projection, is computed. Note that a filter matched to the head boundary (to yield the response $head_n$) is also used to compare the relative positions of the features to the head. And while this form is apparently a linear transformation, we found that computing the magnitudes of the feature gradient responses (by taking the absolute values) produced better pose estimates. Therefore, we assume the absolute values of the responses in the expression of $R_n$.

Given a set of training images along with the pose: $\{(I_m,\phi)|m=1,2,\ldots,M\}$, where $\phi$ may be $\theta_x,\theta_y,$ or $\theta_z$; we apply the above procedure to each image to generate sparse representations $\{X_m=(X_m^n)n=1,\ldots N|m=1,2,\ldots,M\}$. This linearly transformed features are then operated on by the Support Vector Regression (SVR) algorithm to train the relation between $X_m$ and $\phi$. Those skilled in the art will recognize that the SVR is a variant of known Support Vector Machines.

Ultimately, the regression problem is to find a functional relation $f$ from the sparse representation to the sine of the pose angles:

$$f_\phi:X_m \rightarrow \phi, \text{ where } \phi=\theta_y \text{ or } \theta_x. \quad [5]$$

E. Evaluation of Method on NEC Face Database

The data set we have used for training and testing includes a large number of face images. Typically, they are natural images of faces representing a variety of ages, races, genders, and hair styles, taken under wide variations in lighting, background and resolution. The faces are cropped from the images and scaled, so that the center of the eyes are positioned at the center of a 128×128 image frame, and the distance from the eye center to the mouth is 20 pixels. The in-plane rotation is adjusted so that the nose line is vertical.

The training set includes the filter responses $X_m$ of 22508 faces to the random set of filters and the ground truth pose angles $\theta_y$ (yaw) and $\theta_x$ (pitch). The ground truth poses and the pixel coordinates of the eye center and the mouth center are manually annotated. The training set is "pose balanced" so that the training images cover the pose ranges evenly.

This approach of aligning the face images at the eye center has advantages to the aligning the image at the head center. Since eyes (along with the combination with eyebrows) are the most prominent facial features and as such are, relatively, the easiest to detect and localize. Additionally, the eye center is generally a well-defined position on the face while a "head center", is somewhat ambiguous.

While there are numerous choices of nonlinear kernel functions that "bend" the regression hyperplane, we have determined that the Gaussian kernel is most suitable.

The SVR algorithm determines an offset of the regression, and a subset of the training data, and the corresponding Lagrange multiplier from the constrained optimization problem. The support vectors, along with the Lagrange multipliers define the "regression manifold" that represent the pose estimation. Two separate trainings, one for the yaw estimation and the other for the pitch estimation, generate two sets of support vectors. The training for the yaw angles generated 15,366 support vectors and the training for the pitch angles generated 18,195 support vectors.

We have tested the trained SVR to the dataset of 3,290 face images. The images in the test data do not contain any faces which appear in the training set. The testing set also covers wide ranges of lighting conditions and image quality.

Figure 5:
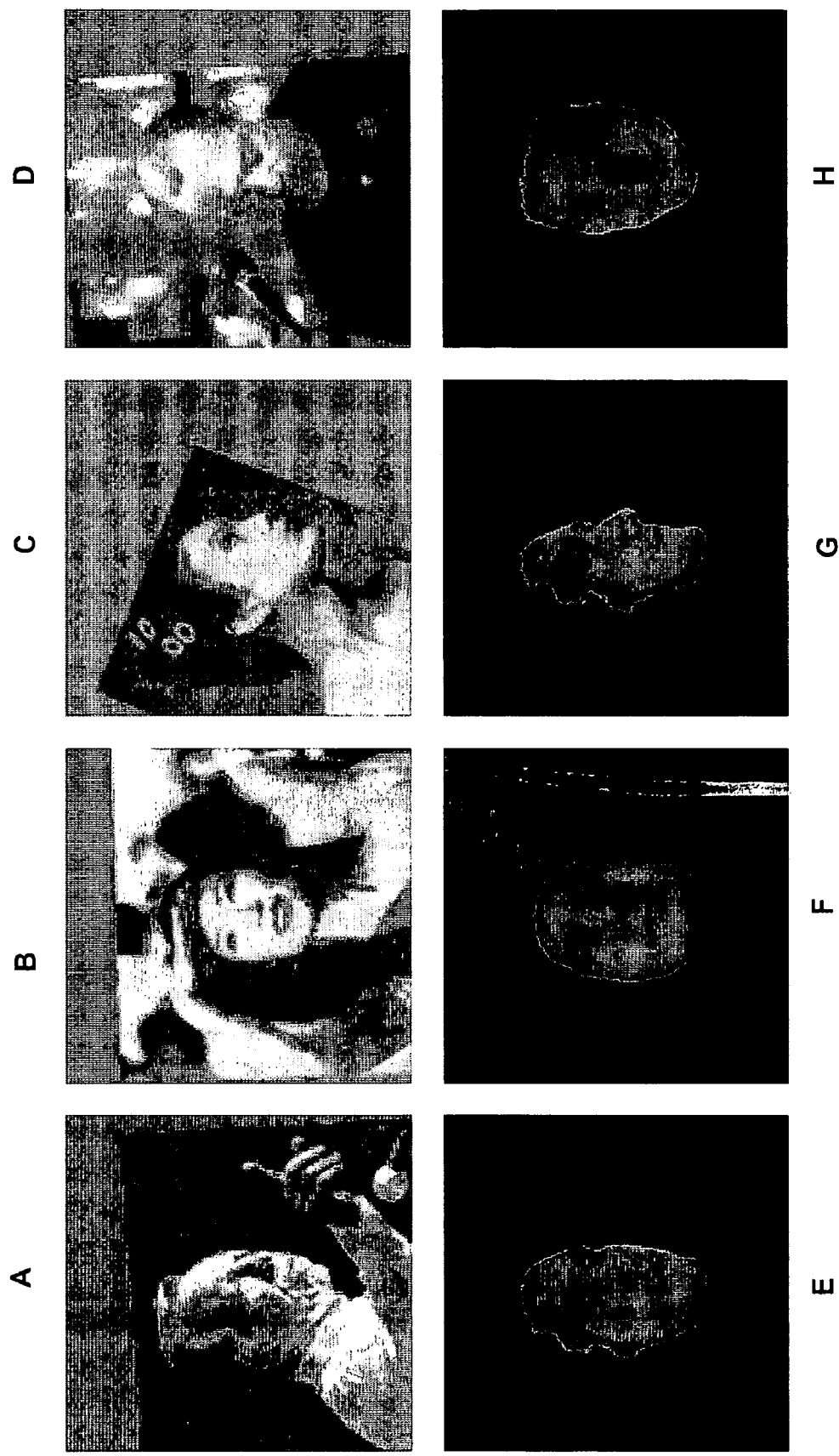
FIG. 5 is a set of estimated poses showing images having different poses (5A-5D) and rendered images using the estimated poses (5E-H)
Figure 6:
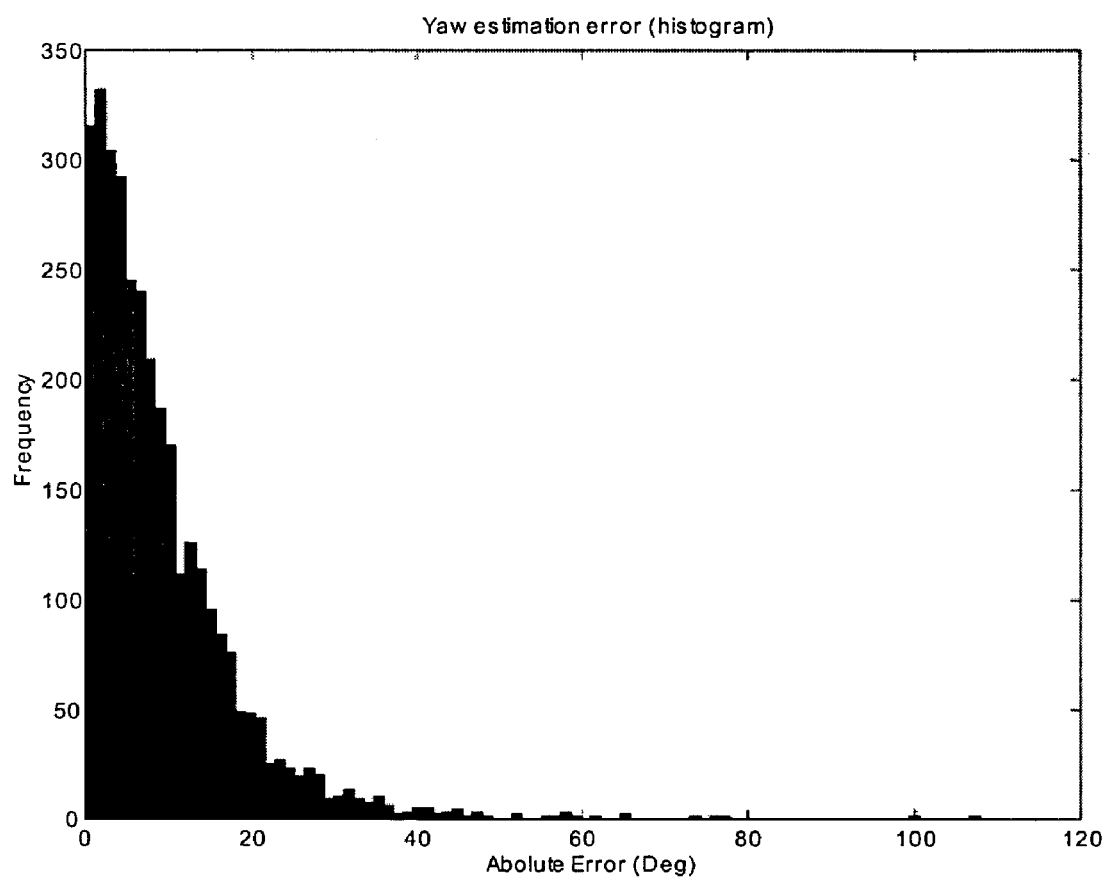
FIG. 6 and FIG. 7 are graphs showing the error distribution for the estimates of FIG. 5A-5D.
Figure 7:
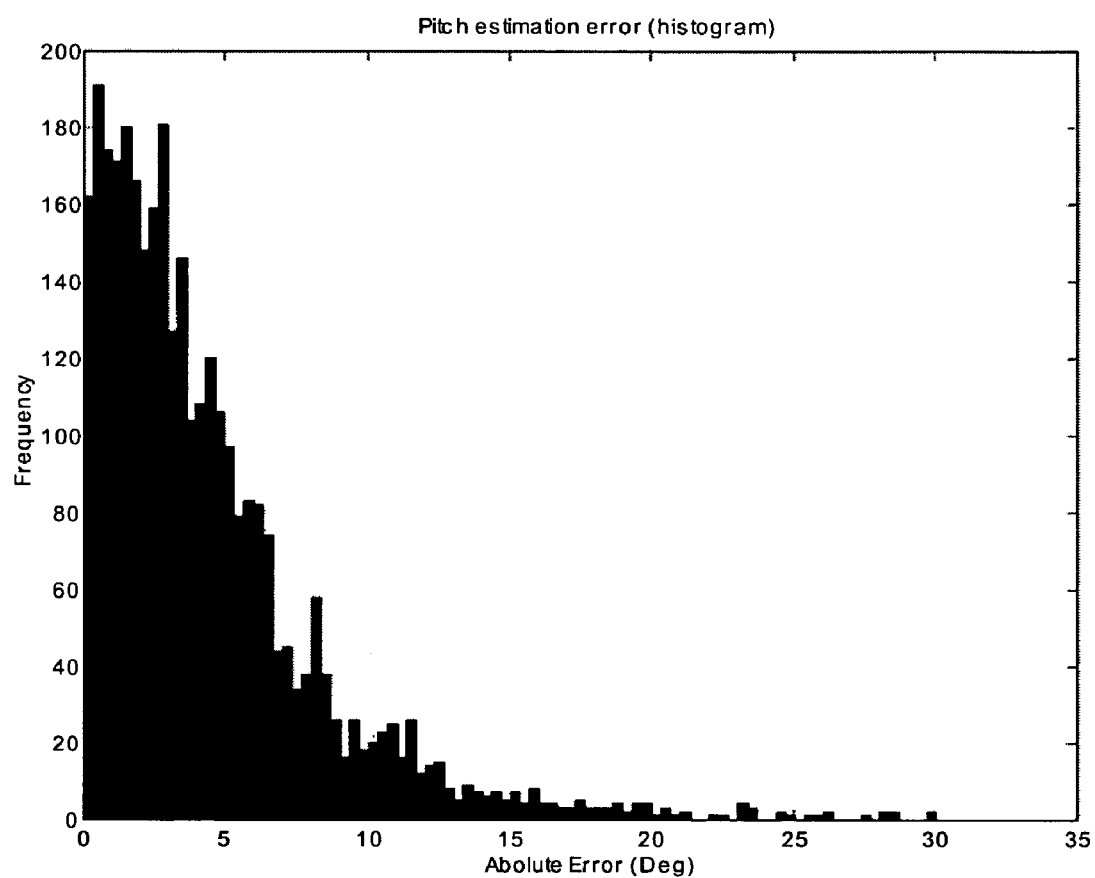

With reference to FIG. 5, there is shown some of the images (5A-5D) and estimated poses (5E-5H), where a 3D face model is used to render the faces having the estimated poses. The error distributions of each of the estimates are shown in FIG. 6. and FIG. 7. The cumulative distribution of both the yaw and pitch estimation is shown in FIG. 8.

Figure 8:
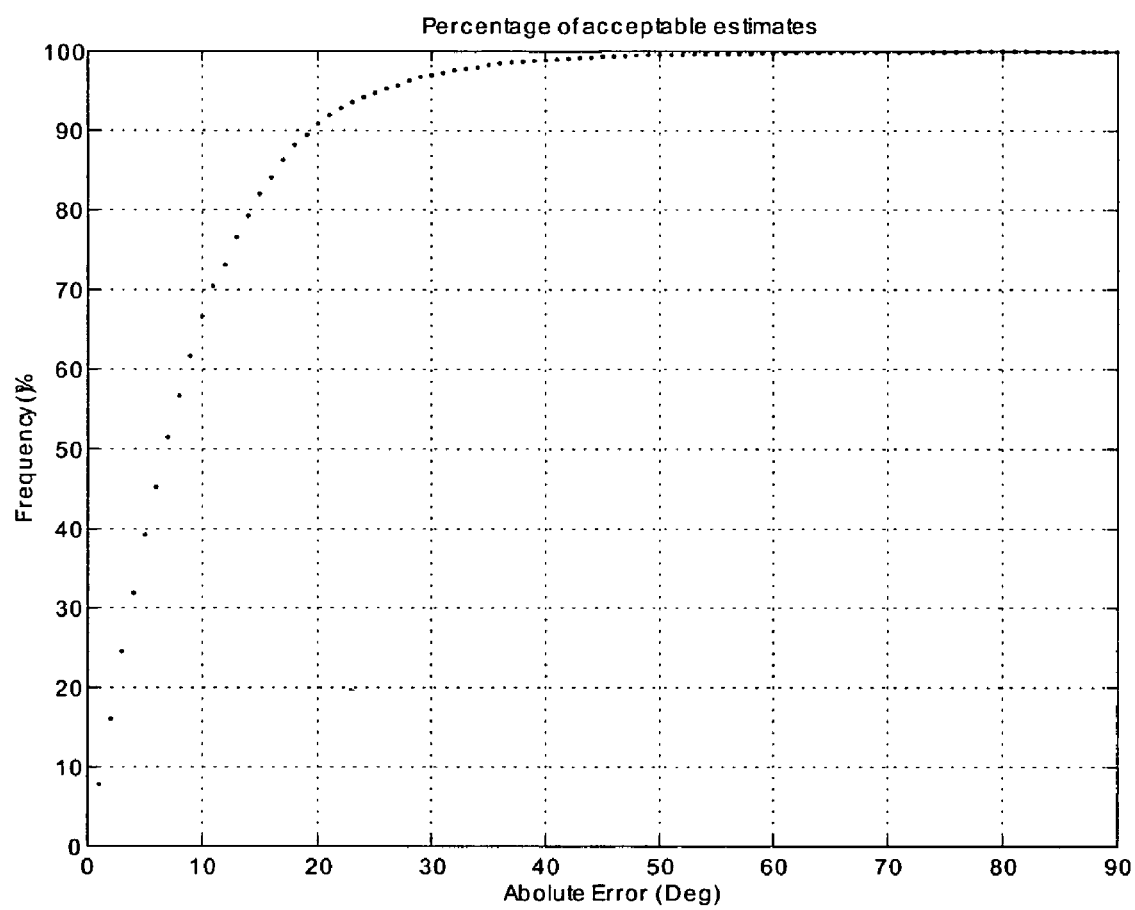
FIG. 8 is a graph showing the cumulative distribution of both the yaw and pitch estimation.

With continued reference now to that FIG. 8., plotted therein is the percentage of the test faces, whose pose estimates (of both yaw and the pitch) have less than the given error level. For example, slightly more than ⅔ of the images have both yaw and pitch estimates within 10 degrees from the ground truth poses. At 20 degrees, around 93% of the faces have pose estimates within 20 degrees.

Figure 9:
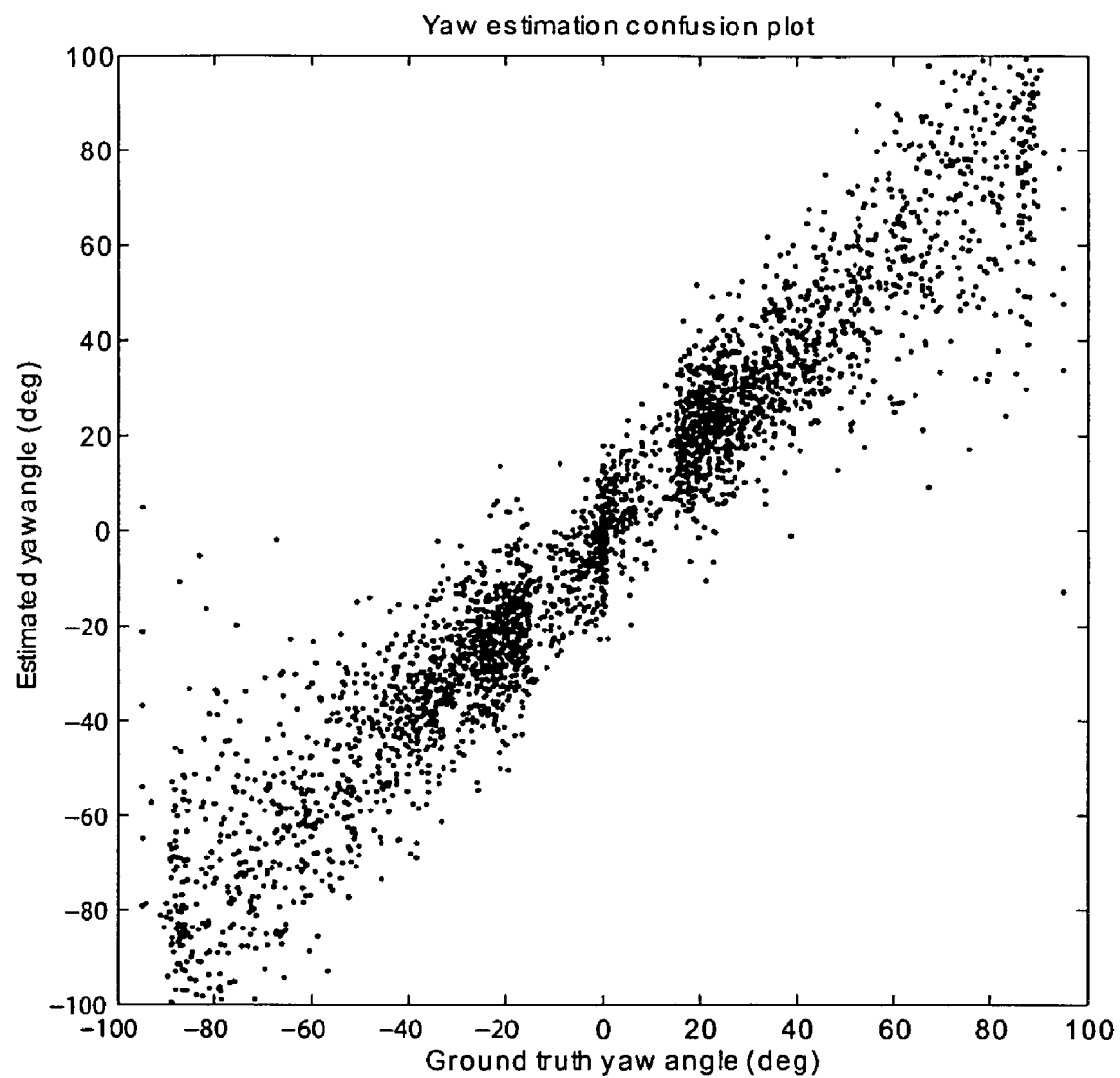
FIG. 9 and FIG. 10 are graphs showing the estimated poses of the test data plotted against the ground truth (annotated) poses.
Figure 10:
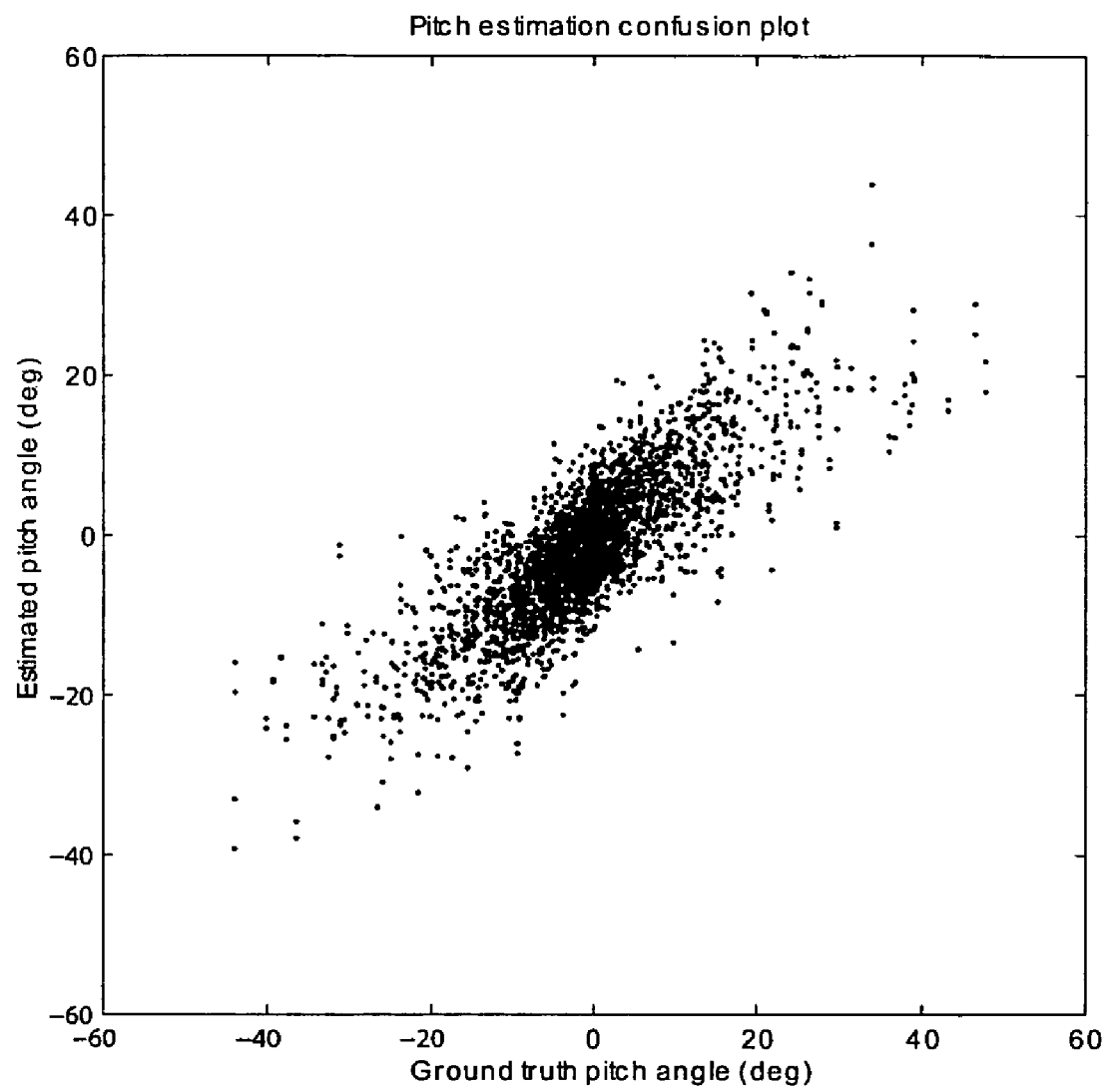

Turning now to FIG. 9 and FIG. 10, the estimated poses of the test data is plotted against the ground truth (annotated) poses). With reference to these Figs, one can see that our method shows limitations when the facial poses approach profiles (+90 or −90). Such a limitation may be expected as our head model is not able to model the feature shape(s) at such extreme (perpendicular) poses.

Finally, with reference to Table 1, there is shown the performance of our method against the SVR pose estimation using raw images and the SVR pose estimate ion using histogram equalized images. The performance is compared using the mean absolute difference between the annotated pose and the estimated pose, of the 3,290 test images.

Figure 11A:
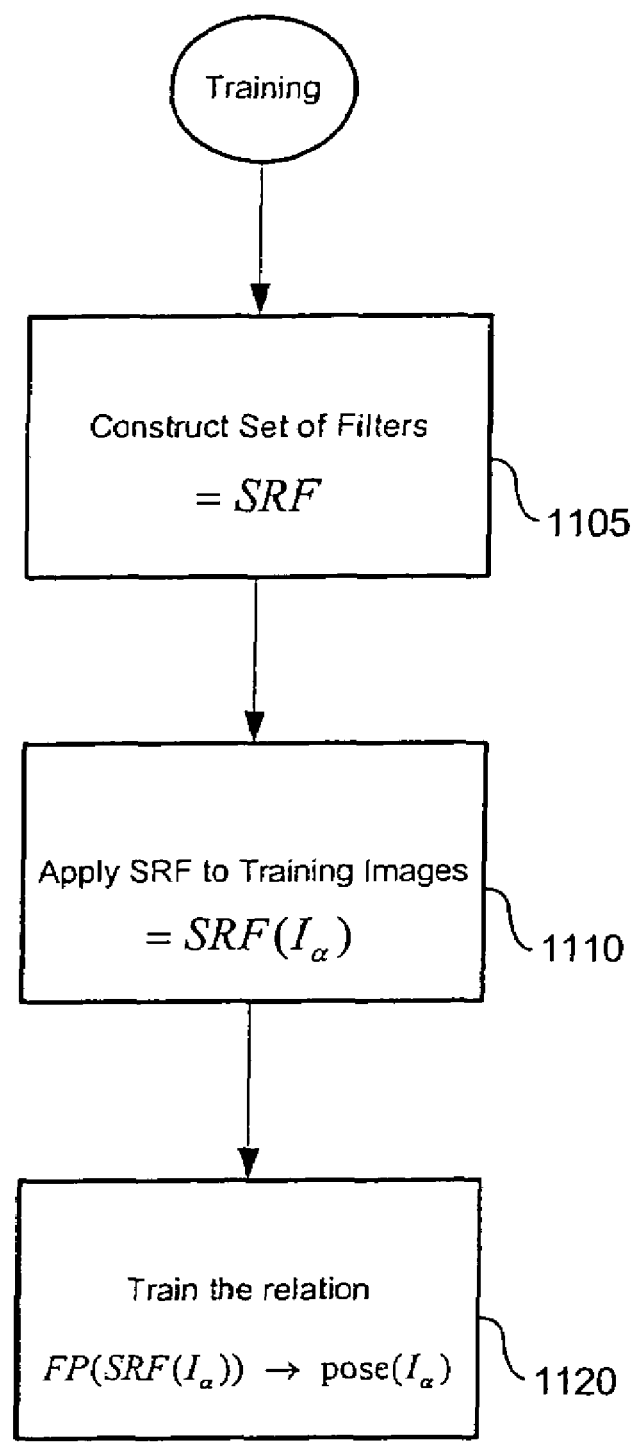
FIG. 11(a-b) is a flow diagram depicting the method of the present invention.

With reference now to FIG. 11(a) there is shown a flowchart depicting an aspect of our inventive method. In particular, FIG. 11(a) depicts the training aspect of our invention. In particular, a sparse representation filter, SRF is constructed at step 1105. This SRF, is applied to training images $I_\alpha$ to produce a set of images SRF($I_\alpha$) at step 1110. Finally, the relation is trained on known poses at step 1120, in which SRF($I_\alpha$)→pose($I_\alpha$), thereby producing the facial pose, FP.

Figure 11B:
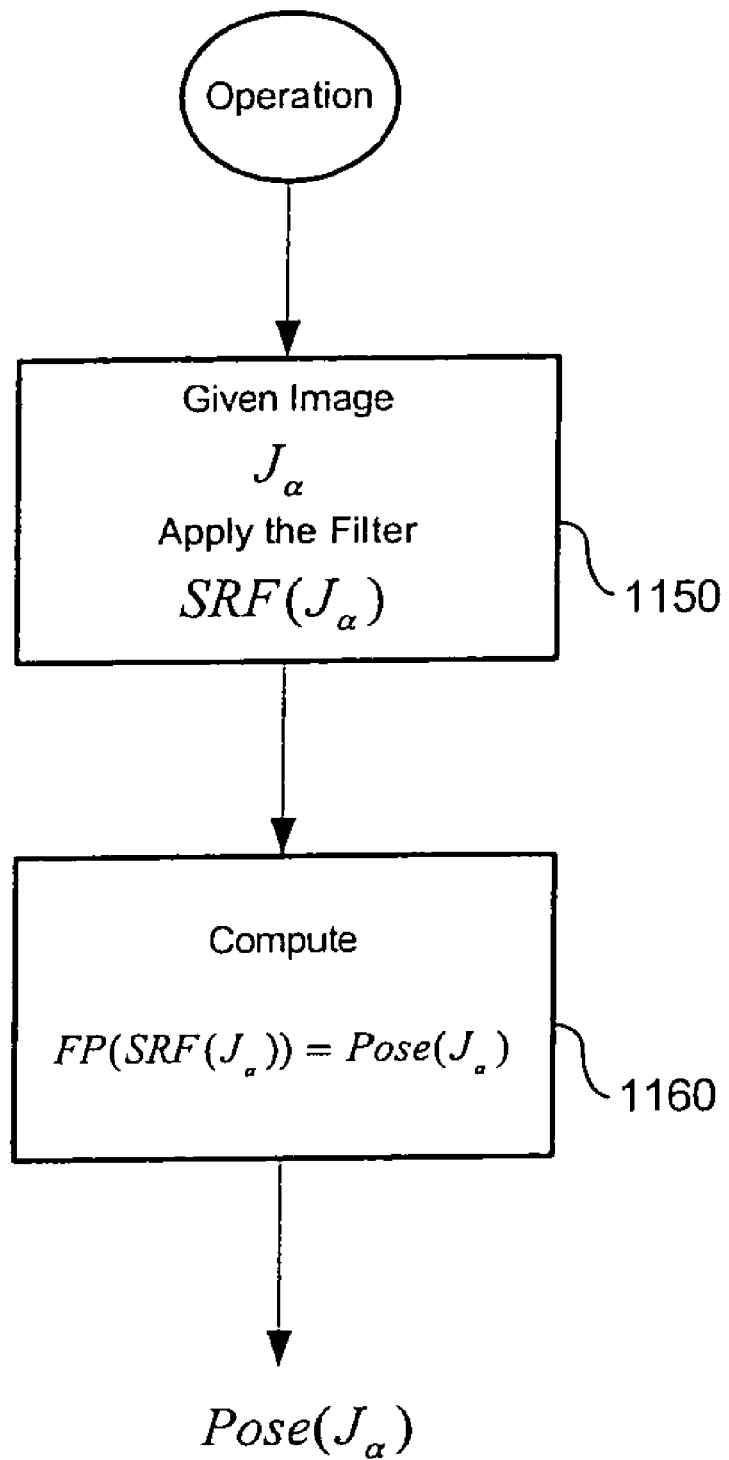

After this training, and with reference now to FIG. 11(b), when given image $J_\alpha$, we compute the sparse representation, SR($J_\alpha$), at step 1150. At step 1160, we compute FP(SRF($J_\alpha$))=Pose($J_\alpha$), thereby producing Pose($J_\alpha$).

Figure 12:
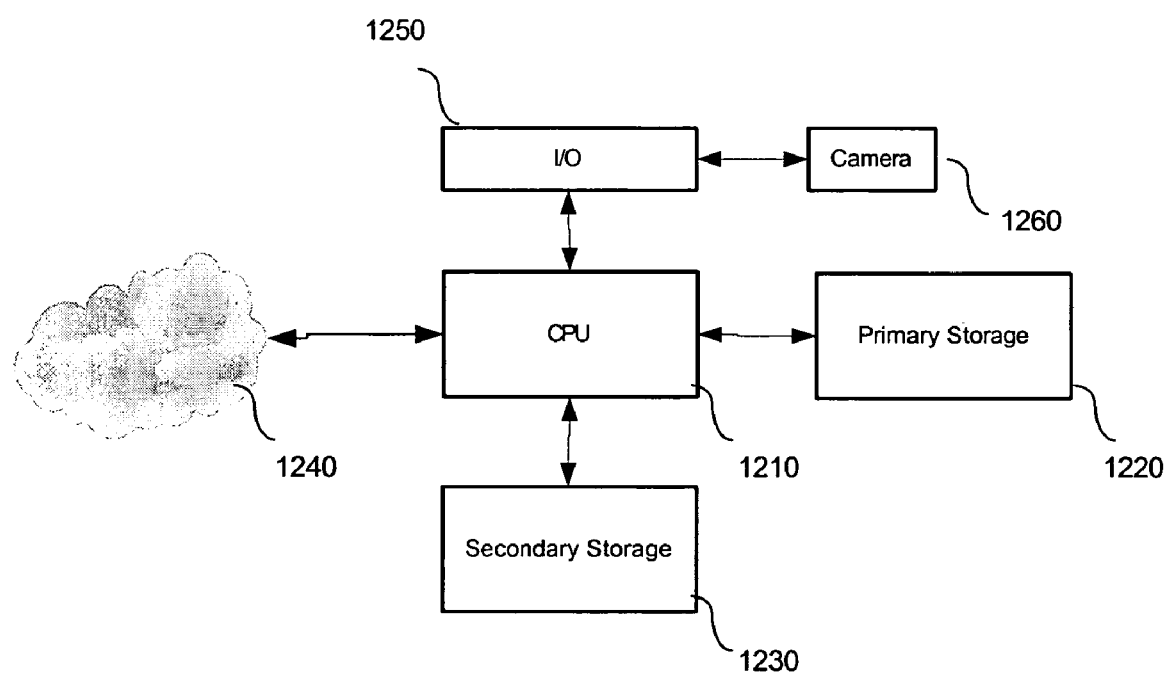
FIG. 12 is a block diagram of a computing platform suitable for practicing the inventive method according to the present invention.

Advantageously, our inventive method may be practiced on relatively inexpensive, readily available computing equipment. In particular, and with reference to FIG. 12, there is depicted a block diagram of such a computer for practicing our invention. In particular, Central Processing Unit (CPU) 1210, is interconnected with and in communication with primary storage 1220 which may include semiconductor memory, secondary storage 1230, and/or network interconnect 1240. Input/Output subsystem 1250, provides access to camera or other input device 1260.

TABLE 1

Comparison Among Pose Estimation Methods In Mean Absolute Error

| Method | Yaw Estimation Error (deg) | Pitch Estimation Error (deg) |
|---|---|---|
| Raw Image | 12.27 | 6.00 |
| Raw Image + Hist.Eq. | 10.95 | 4.87 |
| Sparse Representation | 7.75 | 4.30 |

Of course, it will be understood by those skilled in the art that the foregoing is merely illustrative of the principles of this invention, and that various modifications can be made by those skilled in the art without departing from the scope and spirit of the invention. Accordingly, my invention is to be limited only by the scope of the claims attached hereto.

What is claimed is:

1. A method of estimating a pose of a human head in natural scenes comprising the steps of:

generating, a sparse representation of a human face by transforming a raw facial image into sets of vectors representing fits of the face comprising fits of whole facial features that represent the geometry (position, size and orientation) of the features, to a random, sparse set of model configurations; wherein the sparse representation is a collection of projections to a number of randomly generated possible configurations of the human face, wherein irrelevant variations of face appearance are suppressed by the application of filters whose shapes are matched to that of facial features and the filters are generated to match the variety of actual facial feature shapes of individuals after an out-of-plane rotation.

training, the sparse representation to a set of face(s) in known poses; and determining, a pose of a head by comparing the trained representation(s) to a facial image.

2. The method according to claim 1 wherein the transforming step further comprises the step of:

collecting, salient features of the face image which are useful to estimate the pose of the face.

3. The method according to claim 2 wherein the training step further comprises the steps of:

learning, using Support Vector Regression (SVR), a relation between the sparse representation and the pose(s).

* * * * *